US012599532B2

(12) United States Patent
    Glazer

(10) Patent No.:    US 12,599,532 B2
(45) Date of Patent:         Apr. 14, 2026

(54) THREE DIMENSIONAL LOG SPIRAL STRUCTURES FOR IMPROVING TRANSPORTATION

(71) Applicant: Yaron Y. Glazer, San Francisco, CA (US)

(72) Inventor: Yaron Y. Glazer, San Francisco, CA (US)

( * ) Notice: Subject to any disclaimer, the term of this patent is extended or adjusted under 35 U.S.C. 154(b) by 0 days.

(21) Appl. No.: 18/406,406

(22) Filed: Jan. 8, 2024

(65) Prior Publication Data

US 2024/0225938 A1      Jul. 11, 2024

Related U.S. Application Data

(60) Provisional application No. 63/437,711, filed on Jan. 8, 2023.

(51) Int. Cl.
    *A61H 1/02*        (2006.01)
    *B25J 9/00*        (2006.01)
    *B62D 57/032*      (2006.01)

(52) U.S. Cl.
    CPC ......... *A61H 1/0262* (2013.01); *A61H 1/0266* (2013.01); *B25J 9/006* (2013.01); *B62D 57/032* (2013.01)

(58) Field of Classification Search
    CPC ..... A61H 1/0262; A61H 1/0266; B25J 9/006; B62D 57/032
    See application file for complete search history.

(56) References Cited

U.S. PATENT DOCUMENTS

| 7,111,696 | B2 * | 9/2006 | Miyazaki | B62D 57/032 |
| | | | | 180/8.5 |
| 9,050,236 | B2 * | 6/2015 | Kudoh | A61H 1/024 |
| 9,295,302 | B1 | 3/2016 | Reed et al. | |
| 9,328,717 | B1 | 5/2016 | Walker | |
| 9,763,848 | B1 | 9/2017 | Handzic et al. | |
| 9,878,576 | B2 | 1/2018 | Hein | |
| 10,144,464 | B1 * | 12/2018 | Buerger | F16H 9/04 |
| 10,383,742 | B2 | 8/2019 | Overes et al. | |

(Continued)

FOREIGN PATENT DOCUMENTS

| CN | 106892012 | A | 6/2017 |
| CN | 111168648 | A | 5/2020 |
| DE | 102018216945 | A1 | 4/2020 |

OTHER PUBLICATIONS

"Spirals inspire walking aids for people with disabilities," https://www.sciencenews.org/article/spirals-inspire-walking- aids-people-disabilities. Science News, Nov. 15, 2014, vol. 186, No. 10 [Date accessed: Sep. 2, 2022].

(Continued)

*Primary Examiner* — Valentin Neacsu
*Assistant Examiner* — Marlon A Arce
(74) *Attorney, Agent, or Firm* — Bold IP, PLLC; Christopher Mayle

(57) ABSTRACT

A system and method for a transportation device that utilizes an alternative biomechanics framework for the human lower body that may be used in any transportation vehicle in conjunction or as an alternative to wheels whereby the bones, muscles, and connective tissue of the lower body function together to produce the mechanics of a single wheel rather than the conjoined pendulums of the leading inverted pendulum model of biomechanics.

8 Claims, 9 Drawing Sheets

(a) Embodiment 1, Transition, Front view (b) Embodiment 1, Transition, Side view

(56)  References Cited

U.S. PATENT DOCUMENTS

| | | | |
|---|---|---|---|
| 10,463,562 | B2 | 11/2019 | Chavarria et al. |
| 10,799,381 | B2 * | 10/2020 | Lee ........................ A61F 5/0102 |
| 11,008,058 | B2 | 5/2021 | Zarrouk |
| 11,198,213 | B2 * | 12/2021 | Chen ..................... F16H 19/001 |
| 2006/0185703 | A1 | 8/2006 | Townsend et al. |
| 2006/0270951 | A1 * | 11/2006 | Ikeuchi ................. B25J 9/0006 |
| | | | 623/24 |
| 2015/0134080 | A1 * | 5/2015 | Roh ........................ B25J 9/1694 |
| | | | 623/32 |
| 2016/0038313 | A1 * | 2/2016 | Kim ........................ B25J 9/104 |
| | | | 623/24 |
| 2017/0185697 | A1 | 6/2017 | Handzic et al. |

OTHER PUBLICATIONS

Handzic, Izmet. "Design and Testing of a Motion Controlled Gait Enhancing Mobile Shoe (GEMS) for Rehabilitation." Thesis submitted in partial fulfillment of the requirements for the degree of Master of Science in Mechanical Engineering, Dept. of Mechanical Engineering, College of Engineering, University of South Florida, Mar. 22, 2011 [Date accessed: Sep. 1, 2022].

Mostyn, Vladimir et al. "The synthesis of a segmented stair-climbing wheel," International Journal of Advanced Robotic Systems. Jan.-Feb. 2018: 1-11 [Date accessed: Sep. 1, 2022].

* cited by examiner (a) Embodiment 1, Transition, Front view (b) Embodiment 1, Transition, Side view Attachment Site
Seat
Hip Joint
Band
Axle
Wheel Hub
Knee Joint
Muscle
Shaft
Tread Hub
Ankle Joint
Foot Spiral Pelvis
Leg
Foot (a) Embodiment 1, Mid-Stride, Front view (b) Embodiment 1, Mid-Stride, Side view Attachment Site
Seat
Hip Joint
Band
Axle
Wheel Hub
Knee Joint
Muscle
Shaft
Tread Hub
Ankle Joint
Foot Spiral Pelvis
Leg
Foot (a) Embodiment 1, Transition, Top view (b) Embodiment 1, Mid-Stride, Top view Band Attachment Site Hip Joint Seat Pelvis Attachment Site Band Hip Joint Seat Pelvis

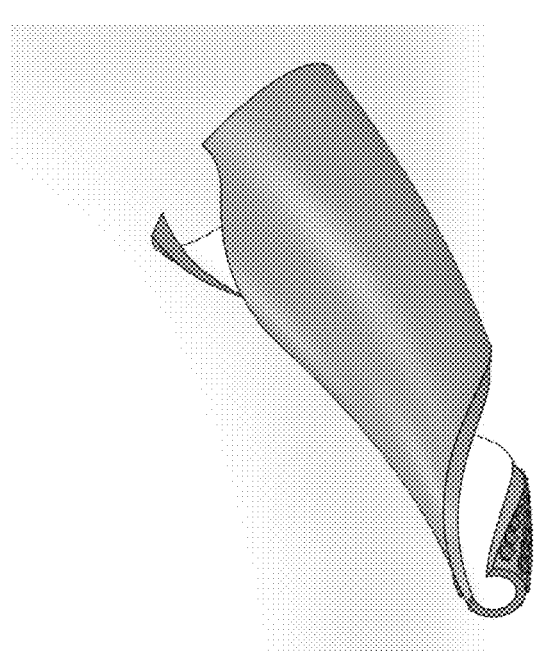
(b) Embodiment 2, Alternative Spiral Design
FIG. 6
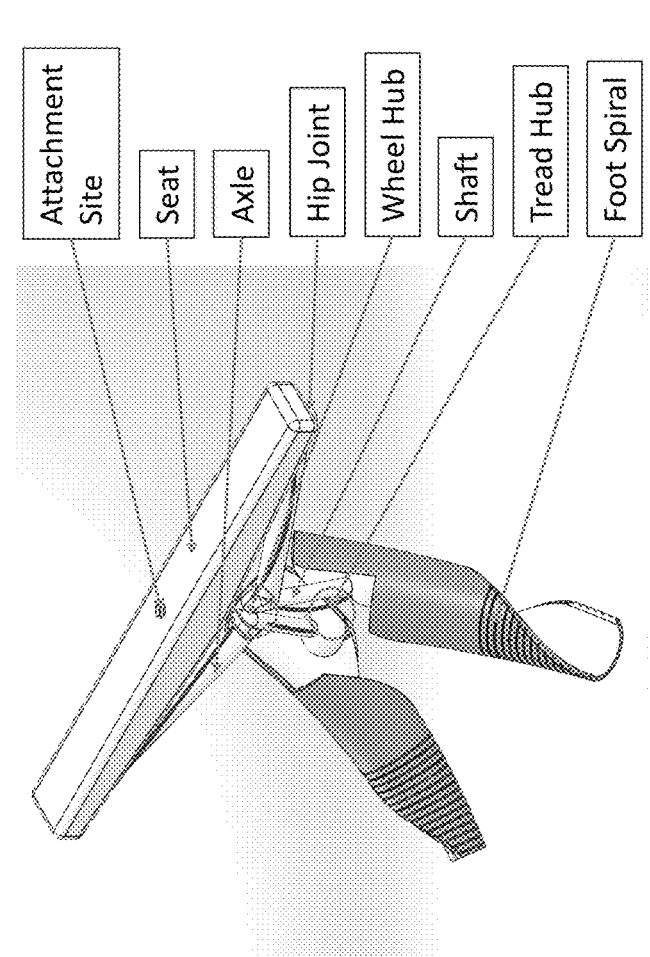
Attachment Site
Seat
Axle
Hip Joint
Wheel Hub
Shaft
Tread Hub
Foot Spiral
(a) Embodiment 2

THREE DIMENSIONAL LOG SPIRAL STRUCTURES FOR IMPROVING TRANSPORTATION

CROSS REFERENCE TO RELATED APPLICATIONS

This application is a non-provisional application which claims priority to U.S. Provisional Application No. 63/437,711 filed on Jan. 8, 2023 which is incorporated by reference in its entirety.

FIELD OF THE DISCLOSURE

The overall invention relates generally to transportation and, more particularly, to an articulated structure to replace a wheel that adapts to various terrains or other substrates while providing both support and traction for effective mobility utilizing biomechanics of the human anatomy.

BACKGROUND

The basic wheel is a simple machine that has been used in connection with transport for several millennia. Throughout its existence, the wheel has been limited by its inability to traverse obstacles and rugged terrain like human legs. For example, even modern wheelchairs are generally unable to roll over sand or other terrain. Similarly, despite their comparatively great abilities, wheeled off-highway vehicles (OHVs) are unable to transit over such obstacles beyond certain limits, which are often dictated by practical design factors, such as maximum practical wheel diameter, for example.

A partial solution, also in use for millennia, is to smooth/even out the terrain and provide ramps of various kinds to transition between different heights. This continues today, for example, with the installation of ramps at curbs and building entrances to provide wheelchair access. However, grading and providing ramps over the entire world is obviously a practical impossibility. In view of these issues, numerous entities are presently developing alternative solutions in the form of exoskeletons and other powered mobility products. However, as a group, these tend to be extremely costly and have limited scope, and/or are still far from being practically feasible. Thus, a need exists for improved solutions for transport and mobility, such as for persons confined to wheelchairs and for persons and vehicles transiting rough and/or irregular terrain.

SUMMARY

In one embodiment, the system and method is directed to a transportation system and device that utilizes an alternative biomechanics framework for the human lower body that may be used in any transportation vehicle as an alternative to wheels. Under this theory, the bones, muscles, and connective tissue of the lower body function together to produce the mechanics of a single wheel (rather than the mechanics of conjoined pendulums as per the leading inverted pendulum model of biomechanics). As such, some parts of the invention will be familiar, but the mechanics of their use (the controls or algorithm) will be novel.

As the essential mechanics of the invention are biomimetic, components of the invention are referred to by their biomechanical parallels to facilitate understanding. The invention includes two spiral "feet" that function like torsion springs, winding and unwinding serially and symmetrically to produce torque at the tread hub. The torque is translated via a virtual shaft, wheel hub, and axle mechanism (i.e., a "leg" assemblage formed by a series of symmetric rods, joints, and belts) to a "seat" device that rotates around the invention's midline while maintaining vertical and mediolateral stability at the "attachment site" to external devices. The four movements of each "foot" and "leg" unit during one "step" cycle—inversion and clenching of the swing spiral and abduction of the swing "leg" (these three movements together, "winding") followed by medial roll (or "unwinding") of the foot spiral once it enters the stance portion of the step cycle—require a power source, but all other movements in the system follow directly due to mechanical properties of the elements that comprise the system with no additional power required.

As each spiral foot passes through a stance phase where it is in contact with the ground, it produces an elliptical tread during its medial roll with the same properties as one half of a torus. The opposite spiral meanwhile inverts, clenches, and abducts as it swings through the air before taking over as the stance spiral and producing the other half of the torus tread. The torque generated at the tread hub from these countervailing actions is translated to the seat device where it rotates the swing leg in an arc around the invention's vertical and mediolateral midline, thereby positioning the swing spiral over the extended midline to initiate the next step cycle. Under optimal operating conditions, the serial countervailing movements of abduction and medial roll produce a consistent and continuous forward motion as experienced at the level of the invention's "attachment site."

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

FIG. 6 illustrates a second embodiment of the concept of the transportation system, as well as an alternative design for the spiral component

DETAILED DESCRIPTION

Figure 1:
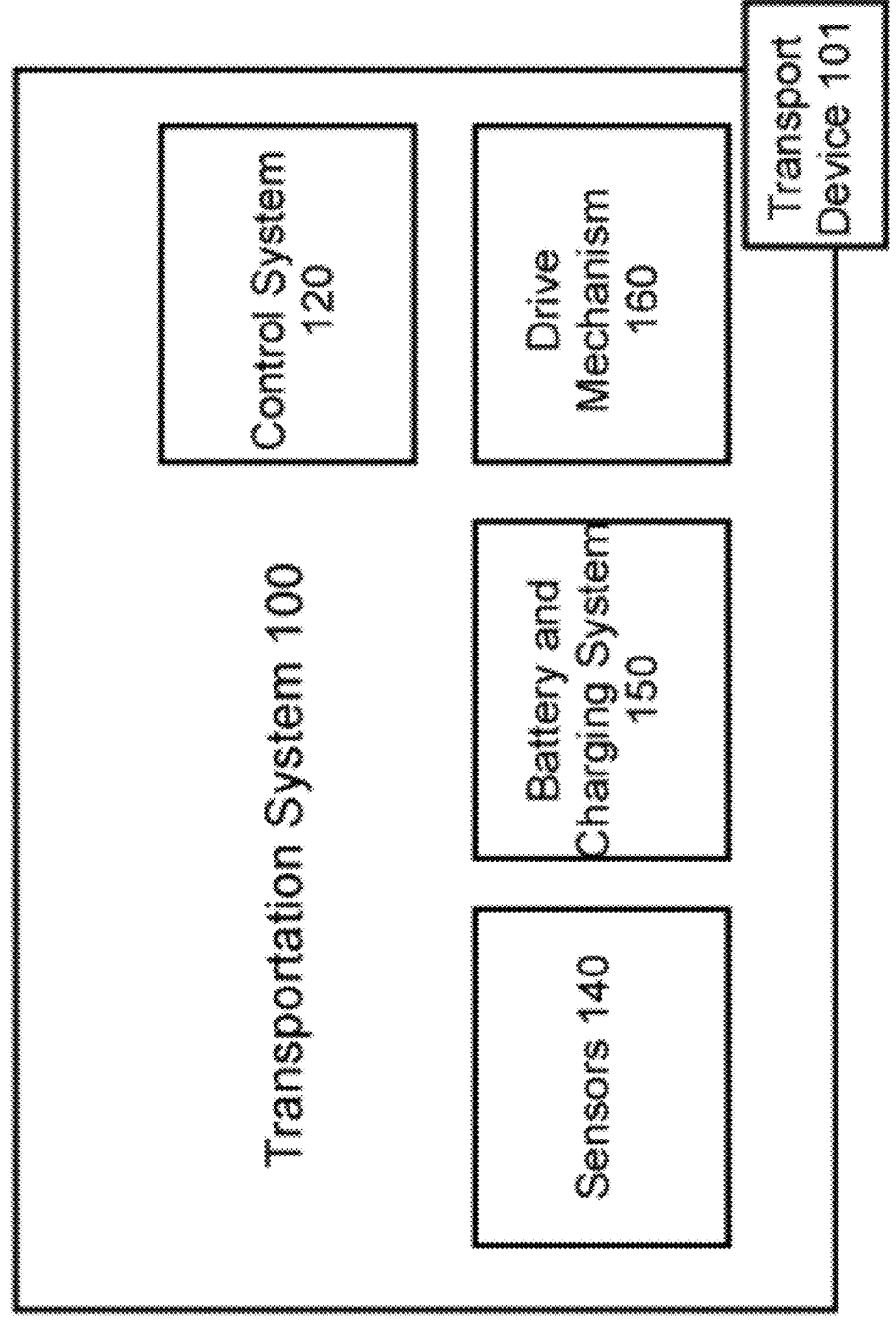
FIG. 1 illustrates the components of the transportation system.

In the Summary above and in this Detailed Description, and the claims below, and in the accompanying drawings, reference is made to particular features (including method steps) of the invention. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with and including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The present disclosure recognizes the unsolved need for one or more transportation systems for transport and mobility on a transport system, as illustrated in the FIGS. such as for transporting persons, machines, and devices.

Figure 3:
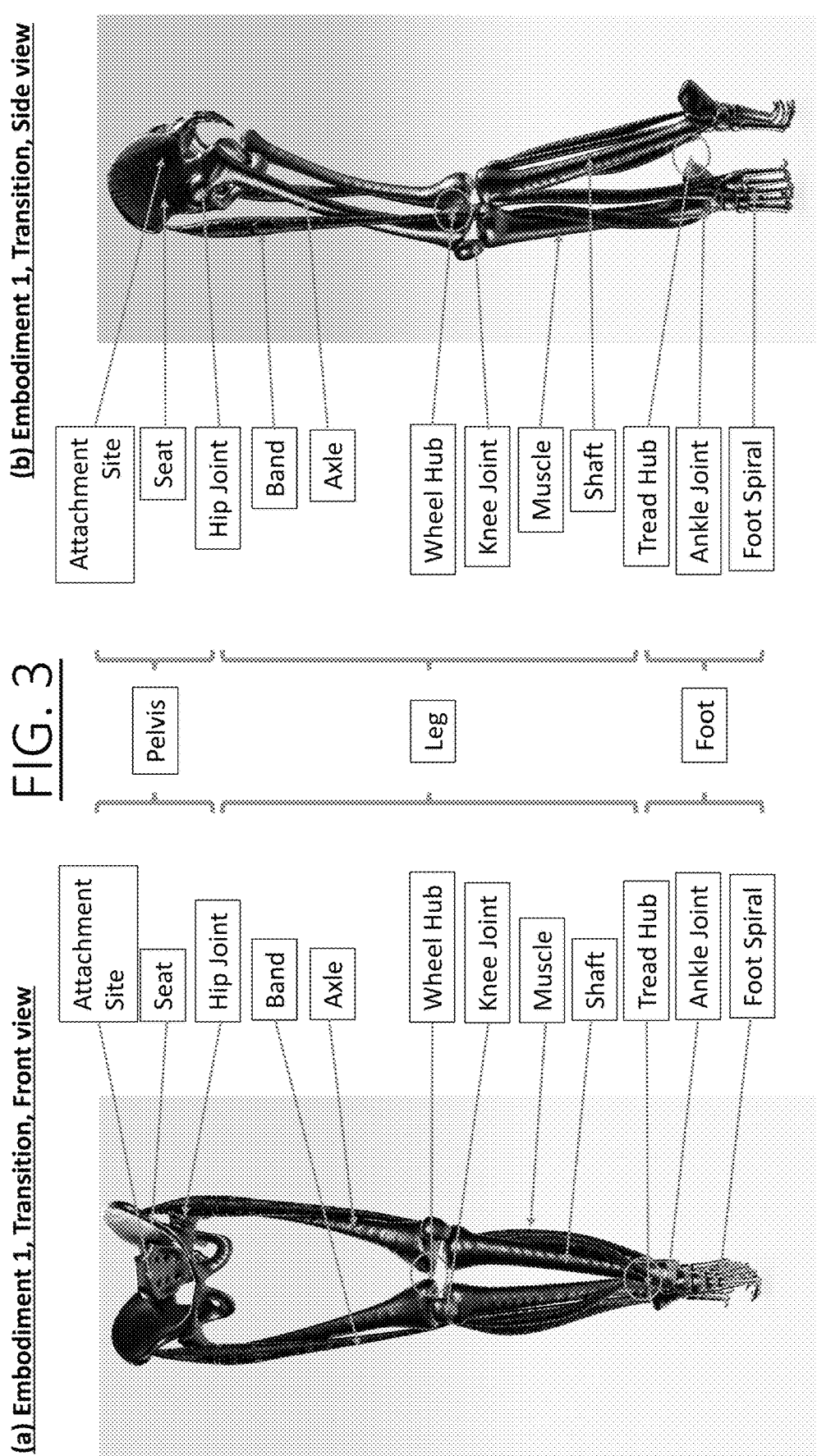
FIG. 3 illustrates one embodiment of the concept of the transportation system in one position of movement from two perspectives.
Figure 4:
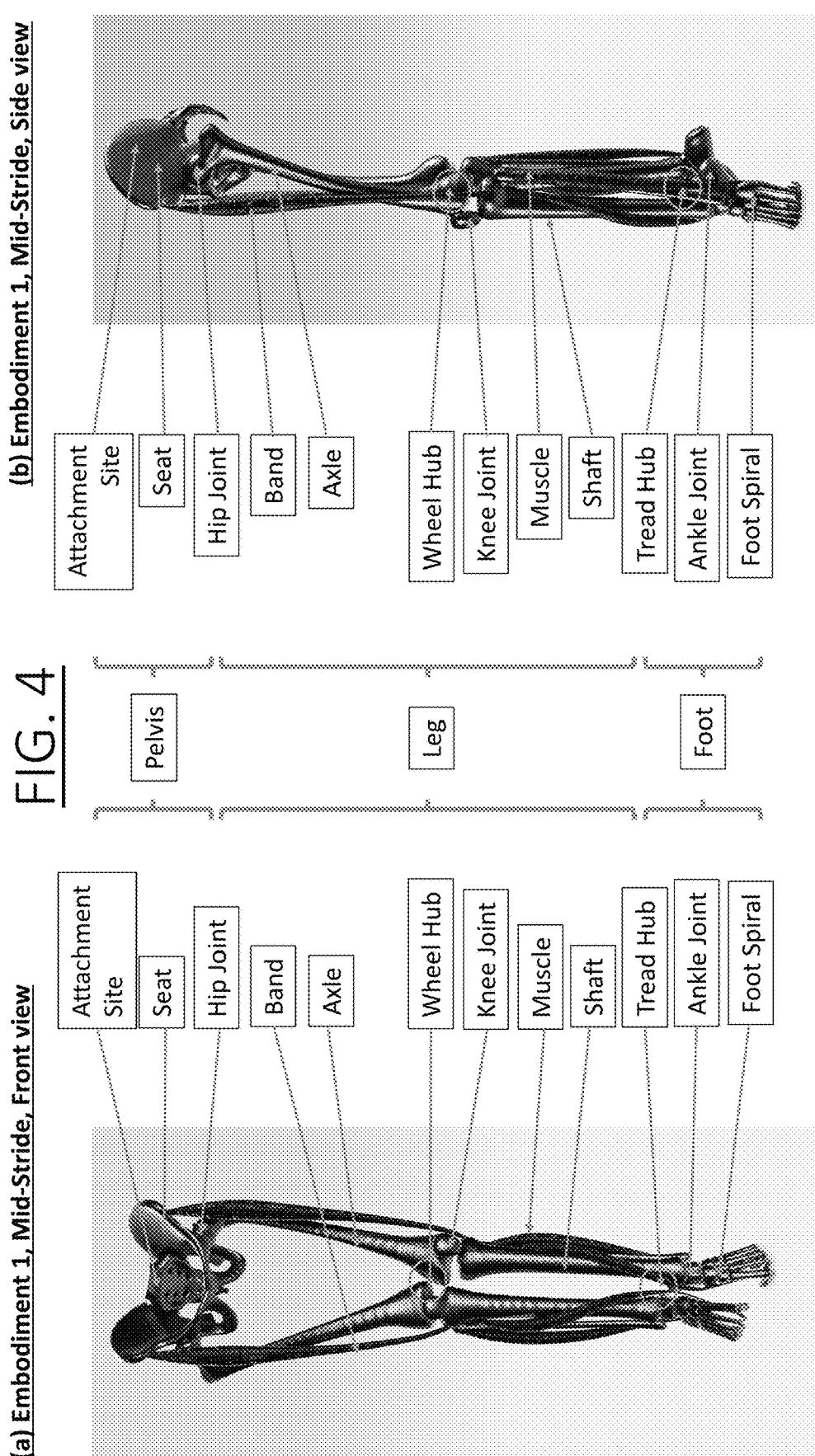
FIG. 4 illustrates the same embodiment of the concept of the transportation system in a different position of movement from the same two perspectives.
Figure 5:
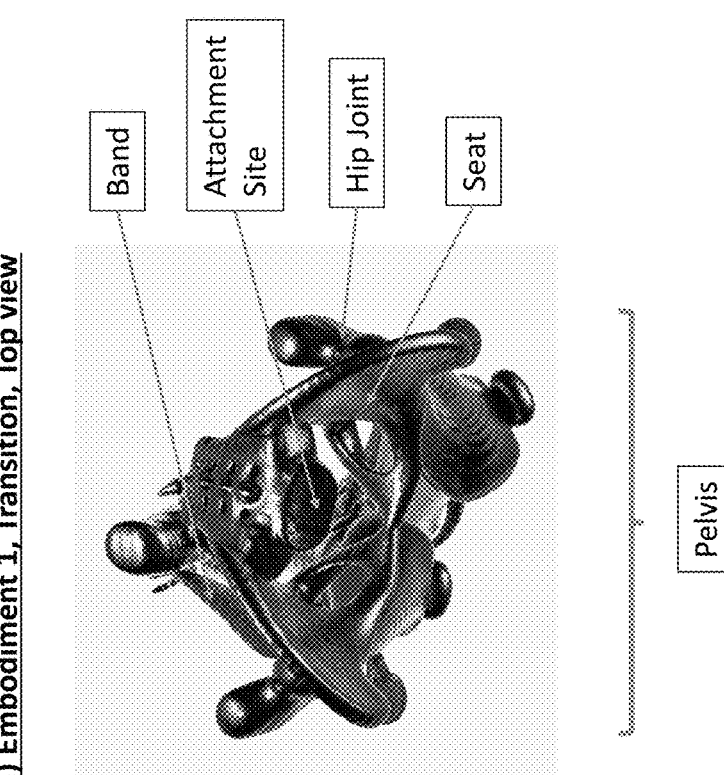
FIG. 5 illustrates the same embodiment of the concept of the transportation system in both positions of movement from a third perspective.

The transportation system may utilize one or more sets of two foot-like spiral devices, each forming a single segment of a three-dimensional log spiral, and each comprising component parts which in one embodiment of the transport system could have dimensions and mechanical properties equivalent to those of the bones and muscles of the human foot—as illustrated in Embodiment 1 in FIGS. 3, 4, and 5—or take other forms with different materials that provide a similar scope—as in Embodiment 2 in FIG. 6, but which in every embodiment would include torsion spring-like functionality.

Figure 8:
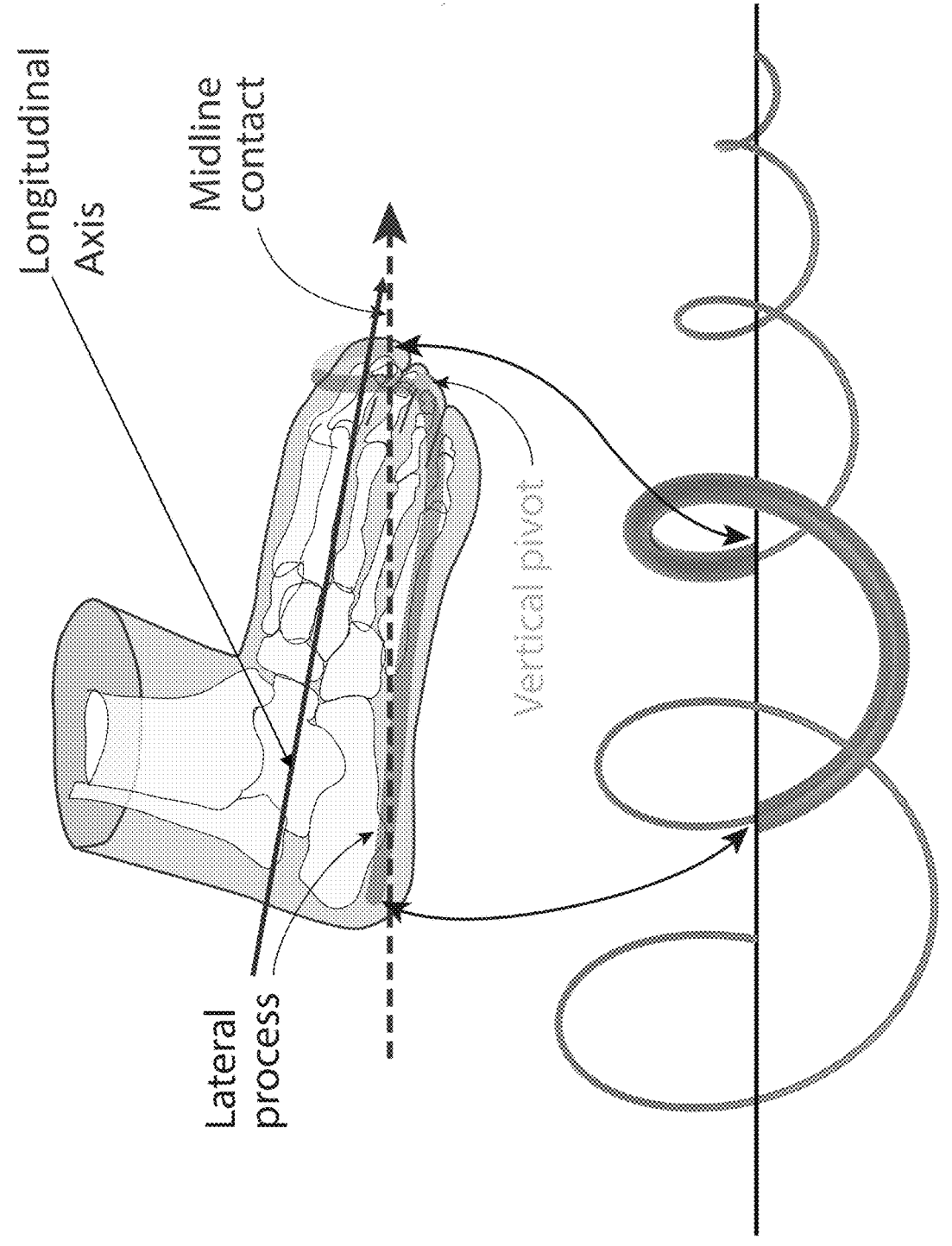
FIG. 8 illustrates another aspect of the transportation system.

The foot-like spirals are the essential component of the invention. The novelty here likely inheres in the use of two separate twists—defined as a single segment, or one complete rotation—of a three-dimensional log spiral (FIG. 8) positioned and operated in counterpoise with the winding and unwinding movements described above in order to produce continuous or cyclic linear motion for the integrated system. The foot-like spirals form the dynamic tread of the wheel device, utilizing a novel mechanism to produce continuous leverage at the point of contact with the surface (one of the essential properties of a standard wheel). More specifically, during motion, one spiral (the "swing spiral") swings through the air while the other (the "stance spiral") makes contact with the ground to drive one half of a cycle. The movements are then repeated with the stance and swing spirals reversed to complete a full cycle.

FIGS. 3, 4, and 5 depict two key points during the cycle for Embodiment 1. FIG. 3 marks the beginning of the stance phase for the left "leg" and the beginning of the swing phase for the right. The left "foot" has just made contact with the ground on the system's extended midline, and the left "hip" is maximally rotated forward (FIG. 5). FIG. 4 marks the mid-point of the stance phase for the left leg, as well as the mid-point of the swing phase for the right leg. Both legs are passing through the frontal plane, as are both hip joints (FIG. 5B) The distance between the "ankles" and "knees" is minimized at the "tread hub" and "wheel hub," respectively, and the right leg and hip are slightly elevated to facilitate clearance (FIG. 4A)

Figure 7:
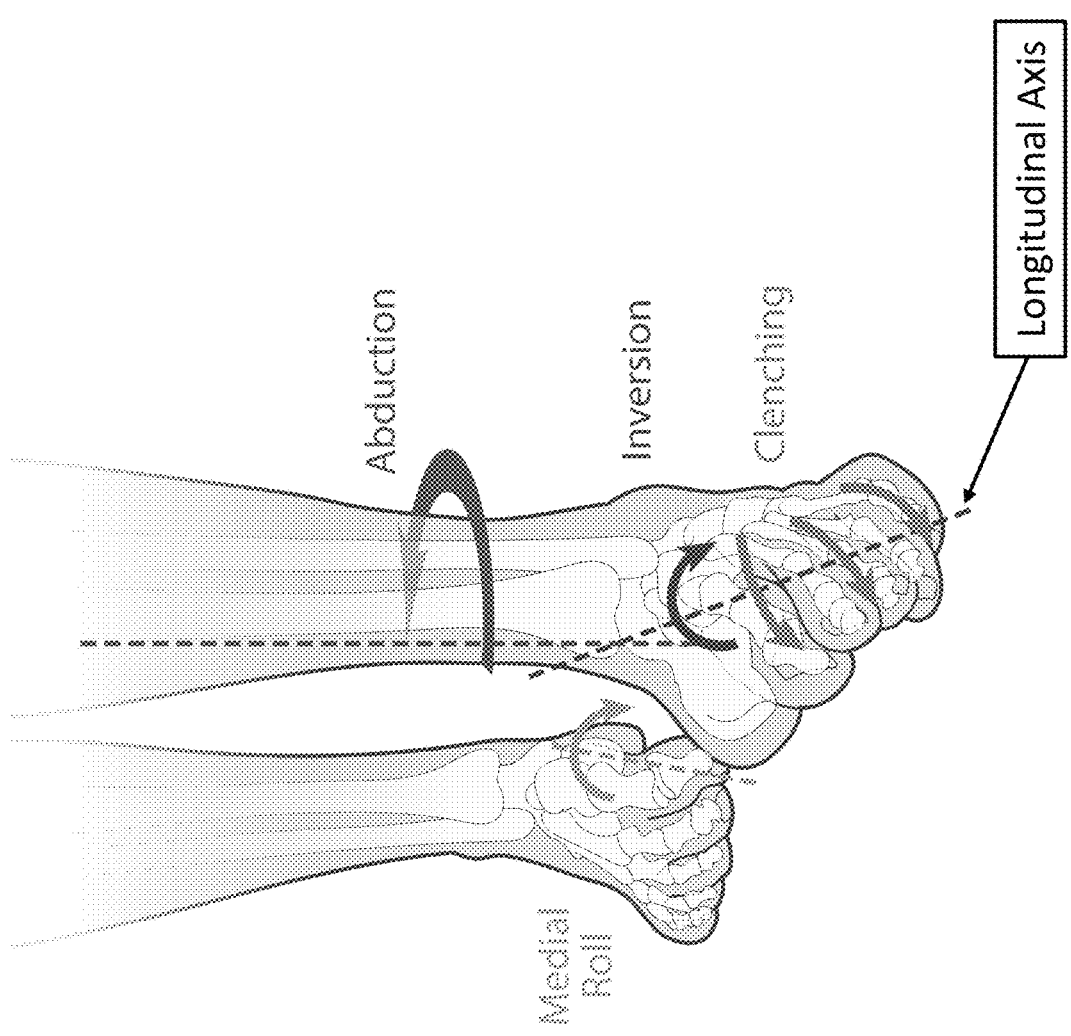
FIG. 7 illustrates another aspect of the transportation system.

During each half-cycle, the swing spiral is inverted (rotated around its longitudinal axis onto its outer edge) and clenched while its "leg" is abducted (rotated backward laterally) (FIG. 7). Together, these three movements "wind" the swing spiral's torsion spring. They also cause the band connecting the spiral to the hip to contract, applying tension on the swing "hip" via the leg and causing the hip to swing forward in an arc around the invention's vertical midline, even as the spiral foot swings backward.

Figure 9:
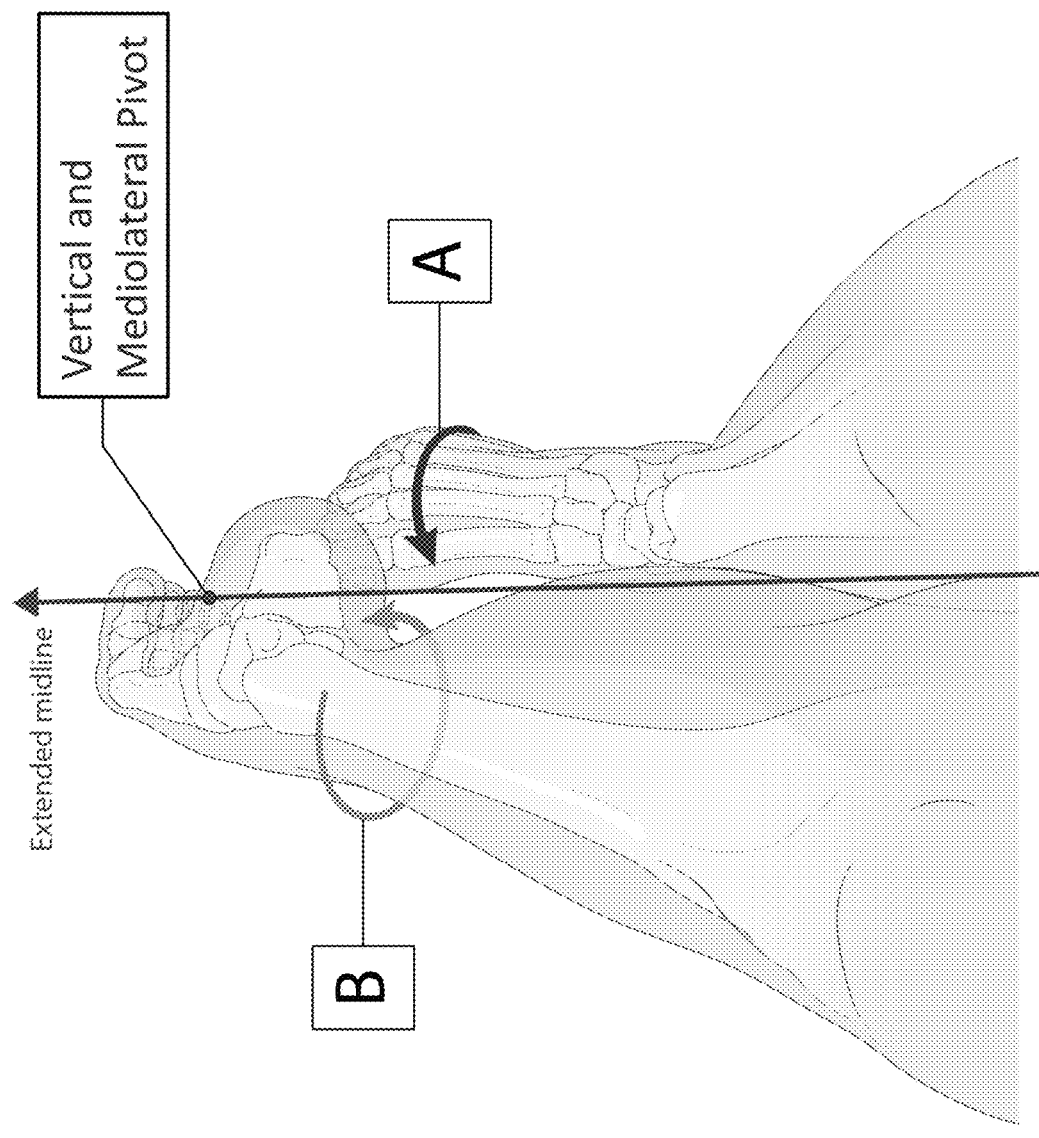
FIG. 9 illustrates another aspect of the transportation system.

Simultaneously, the stance spiral completes a medial roll across its longitudinal axis, which extends from the later edge of its "heel" to the medial tip of its big "toe" (FIG. 7). Once the foot is clenched, inverted, and abducted, tread contact is made by the inverted toenails rather than the sole of the foot as in standard biomechanics (see the left foot in FIG. 3A) The foot first makes contact at its vertical and mediolateral pivot, a virtual point located between the inverted $3^{rd}$ and $4^{th}$ toenails where they touch the surface along the system's extended midline (FIG. 9). The medial roll is then affected by application of the inverse of the three winding movements—everting, unclenching, and adducting the spiral, and thereby unwinding the torsion spring, as the foot moves through its stance phase. The three unwinding movements cause the application of force lateral to the direction of motion (at 90 degrees to the extended midline in the horizontal plane) in series by the inverted $3^{rd}$, $2^{nd}$, and $1^{st}$ "toenails," delineating an elliptical tread. When channeled through the 3D log spiral structure of the foot, this set of movements produces one half of a force couple (complement to the half produced by the winding swing spiral). Over the full stance phase, they result in a half-pirouette by the stance leg in countermovement to the swing of the swing leg.

These winding and unwinding movements repeated back and forth are the only motive forces required to produce continuous forward linear motion for the entire system. Inversion, clenching and abduction are performed via contraction of internal "muscles" (likely utilizing actuators or other existing technology).

The transportation system may include a virtual "tread" hub comprising two or more ankle-like joints. In Embodiment 1, these ankle joints may each have component parts equivalent to those of the human ankle, while in other embodiments they ankle joints may be abstracted representations included essential elements (e.g., inversion, clenching, and abduction capabilities, torsion spring functionality, segmented contact surface, etc.), but utilizing different materials or components. The lateral abduction of the swing leg and the countervailing medial roll of the stance foot create a couple moment at the tread hub. This torque is translated via shaft, wheel hub, and axle to the stance "hip" joint, where (via the "seat") it drives the horizontal rotation of the swing hip in an arc around the system's vertical midline.

This motion advances the system center of mass in a forward direction while positioning the swing spiral for transition to stance.

The virtual shaft may include two lower leg-like devices with component parts equivalent to those of the human lower leg, connecting the tread hub with the virtual "wheel" hub. The virtual wheel hub may include two knee-like joints with component parts equivalent to those of the human knee. The virtual axle may include two upper leg-like devices with component parts equivalent to those of the human upper leg, connecting the wheel hub with the "pelvis". The pelvis-like device may include two hip-like ball-and-socket joints (with component parts equivalent to those of the human hip joint) connected by a swivel seat-like device that rotates back and forth elliptically around an "attachment site" whereby the wheel invention can be appended to a larger system. As with standard wheel physics, an essential characteristic of this attachment site is that it maintains vertical and mediolateral stability while the legs and feet cycle beneath and around it, allowing for continuous forward motion while preventing up-and-down or side-to-side movement of the larger system's center of mass.

The tread hub, shaft, wheel hub, axle, and pelvis like device may come in various forms and may be any length and size to accommodate different uses and include devices intended to replicate the function (if not necessarily the exact form) of the bones, joints, muscles, and connectors of the human lower body. Each of these elements are likely to exist in some form already, though their combined use here may be unique. Similar to the spirals, it's possible that non-biomimetic materials may alter the optimal size or shape of any element. It may even be possible to translate the torque produced at the tread hub into forward motion more directly with a simplified system, such that other parts are not essential.

Transportation system 100, as illustrated in FIG. 1 may have one or more transport devices 110, a control system 120, sensors 140, battery and charging system 150, and a drive mechanism 160. In other embodiments transport system 100 may have a control system 120, sensors 140, battery and/or charging system 150, whereby transportation system 100 is in communication with these components.

Transportation system 100 may include a control system 120 for operational control of the various other components. Transportation system 100 may include one or more sensors 140 for relative positioning, optimal sequential segment operation, and active feedback. Transportation system 100 may include a battery and charging system 150 for performance regenerative pressure plate power systems and solar charging. Transportation system 100 may include a drive mechanism 160 that is connected to control system 120 and may be a high-torque harmonic drive geared hub motor, hydraulic system, or pneumatic system to drive the various components during transportation.

Battery and charging system 150 of transportation system 100 provides the energy to power control system 120, sensors 140, and drive mechanism 160 during the process of transportation. Transportation system 100 may be powered by methods known by those of ordinary skill in the art. In some embodiments, transportation system 100 may plug into an electrical outlet using an electrical cord to supply power to control system 120, sensors 140, and drive mechanism 160. Further battery and charging system 150 may include a rechargeable battery pack whereby the rechargeable battery is of a charge, design, and capacity to provide sufficient power to control system 120, sensors 140, drive mechanism 160 during operation for a set period of time needed.

Battery and charging system 150 may have a solar energy collector for collecting and converting solar energy to electrical energy. The solar generated electrical energy then passes through a first controller for distributing the electrical energy. The electrical energy may be stored in a battery; however, it may be used immediately to create a potential energy difference. The battery may hold an electrical-chemical potential sufficient to power the various components of transportation device 101 for a predetermined amount of time.

The battery may be connected to control system 120. Control system 120 may direct current flow to drive mechanism 160 or control system 120 after a preprogrammed or otherwise predetermined amount of time. The control system may include circuitry to provide an interface for the user to interact with, including switches, indicators, and accompanying circuitry for an electronic control panel or mechanical control panel.

Control system 120 may operate to control the actuation of the other systems. Control system 120 may have a series of computing devices which will be discussed in detail later in the description. Control system 120 may be in the form of a circuit board, a memory or other non-transient storage medium in which computer-readable coded instructions are stored and one or more processors configured to execute the instructions stored in the memory. Control system 120 may have a wireless transmitter, a wireless receiver, and a related computer process executing on the processors. Transportation system 100 may be anon-airgap system that allows for electrical connectivity from control system 120 through to the treads.

Computing devices of control system 120, may be any type of computing device that typically operates under the control of one or more operating systems which control scheduling of tasks and access to system resources. Computing devices may be a Raspberry Pi® or other computing devices such as but not limited to a phone, tablet, television, desktop computer, laptop computer, networked router, networked switch, networked bridge, or any computing device capable of executing instructions with sufficient processor power and memory capacity to perform operations of control system 120.

The one or more computing devices may be integrated into control system 120, while in other non-limiting embodiments, control system 120 may be a remotely located computing device or server configured to communicate with one or more other control systems 120. Control system 120 may also include an internet connection, network connection, and/or other wired or wireless means of communication (e.g., LAN, etc.) to interact with other components. The connection allows a user such as user to update, control, send/retrieve information, monitor or otherwise interact passively or actively with control system 120.

Control system 120 may include control circuitry and one or more microprocessors or controllers acting as a servo control mechanism capable of receiving input from sensors 140 and drive mechanism 160, analyzing the input from sensors 140 and drive mechanism 160, and generating an output signal to drive mechanism 160 and battery and charging system 150. The microprocessors (not shown) may have on-board memory to control the power that is applied to drive mechanism 160, sensors 140, and battery and charging system 150 in response to input signals from the user and from sensors 140.

Control system 120 may include circuitry to provide an interface for a user to interact with, including switches and indicators and accompanying circuitry for an electronic control panel or mechanical control panel. Such an interface may present options to the user to select from such as, without limitation, different tread modes and speeds. Control system 120 may be preprogrammed with any reference values, by any combination of hardwiring, software, or firmware to implement various operational modes including but not limited to elevation and terrain values.

The microprocessors in control system 120 may also monitor the current state of circuitry within control system 120 to determine the specific mode of operation chosen by the user. For instance, when "on," the microprocessors may begin to autonomously traverse terrain. Further, such micro-processors that may be part of control system 120 may receive signals from drive mechanism 160, sensors 140, and battery and charging system 150 such as whether any of the components in the various systems need to be replaced.

Drive mechanism 160 may have a harmonic drive geared hub motor. In further embodiments, drive mechanism 160 may be driven by a hydraulic transmission including one or more linear actuators or a hydraulic cylinder. In another embodiment, drive mechanism 160 may be driven by a pneumatic pump or mechanism using compressed air instead of hydraulic fluid through the linear actuators to increase or decrease diameter and make other tread adjustments whereby control system 120 may receive data from sensors 140 and determine the necessary adjustments and output to drive mechanism 16 and provide adjustments to inversion or clenching or abduction and positioning. In other embodiments, drive mechanism 160 may instead have rack and pinion mechanisms, screw drives, four-bar mechanisms, motorized jack, manual powered systems, or other mechanical systems known by those of ordinary skill in the art. In further embodiments there may be one or more geared electric motor(s) at each pivot or a mechanically/electronically connected drive system.

Sensors 140 may include a plurality of detectors mounted to the housing of transportation device 101 in the form of standard infrared ("IR") detectors having photodiodes and related amplification and detection circuitry. In other embodiments, radio frequencies, magnetic fields, infrared, computer vision, potentiometers, ultrasonic sensors, and transducers may be employed. Detectors may be arranged in any number of configurations and arrangements. For example, in one embodiment, transportation system 100 may include an omnidirectional detector mounted to the top and bottom of transportation system 100 to detect signals from a 360 degrees field of view, while in other embodiments, various detectors may be mounted on the side of transportation system 100 which may be used to form a collective field of view of detection. Control system 120 in combination with sensors 140 may use existing or generated maps and satellites to plan an optimal course for best transport results and efficiency. In some embodiments, transportation device 101 may use any number of Lidar systems with improved scanning speed for high-resolution depth mapping.

Detectors may be in the form of wall detectors on the housing of transportation device 110, which may reflect IR light from the sides of transportation system 100 to determine if transportation device 101 is approaching a wall, a raised object, or incline surface or terrain. The wall detectors send a signal through control system 120 to the micropro-cessors containing an input value. The microprocessors then compare the received input value using a comparison function and evaluate the input data against a setting or expec-tation of a certain reference value for an "activation" posi-tion stored within the memory of control system 120. In one embodiment, based on if the input data is above or below the expected reference value, transportation device 101 may activate extension or retraction from a set distance from the wall.

Transportation system 100 may further include "detec-tors" in the form of cliff detectors, which may be able to reflect infrared ("IR") light off the floor near the edges of transportation system 100 to determine if transportation system 100 is approaching a drop off point or another barrier. During operation when transportation system 100 approaches a drop off point, such as the top of a staircase without limitation, the cliff detectors may send a signal through control system 120 to the microprocessors. The microprocessors then compare the received input data using a comparison function and evaluate the input data against a setting or expectation of a certain range stored within the memory of control system 120. For instance, if the calcu-lated distance is greater than the reference distance, the microprocessor sends a signal through control system 120 to drive mechanism 160 whereby transportation system 100 may begin deployment or extension at a set distance from terrain, variable, or environment change.

Transportation system 100 may have detectors in the form of impact sensors that are triggered when transportation system 100 has a collision with another object to protect and retract components. For example, having detectors may be particularly useful during operation when transportation system 100 is about to collide with an outside object. The impact detectors send a signal through control system 120 to the microprocessors containing an input value. The micro-processors then compare the received input value using a comparison function and evaluate the input data against a setting or expectation of a certain reference value stored within the memory of control system 120. If the calculated value is outside the expected reference value, the micropro-cessors then send a signal through control system 120 to drive mechanism 160 commanding the motor to drive trans-portation system 100 away.

Figure 2:
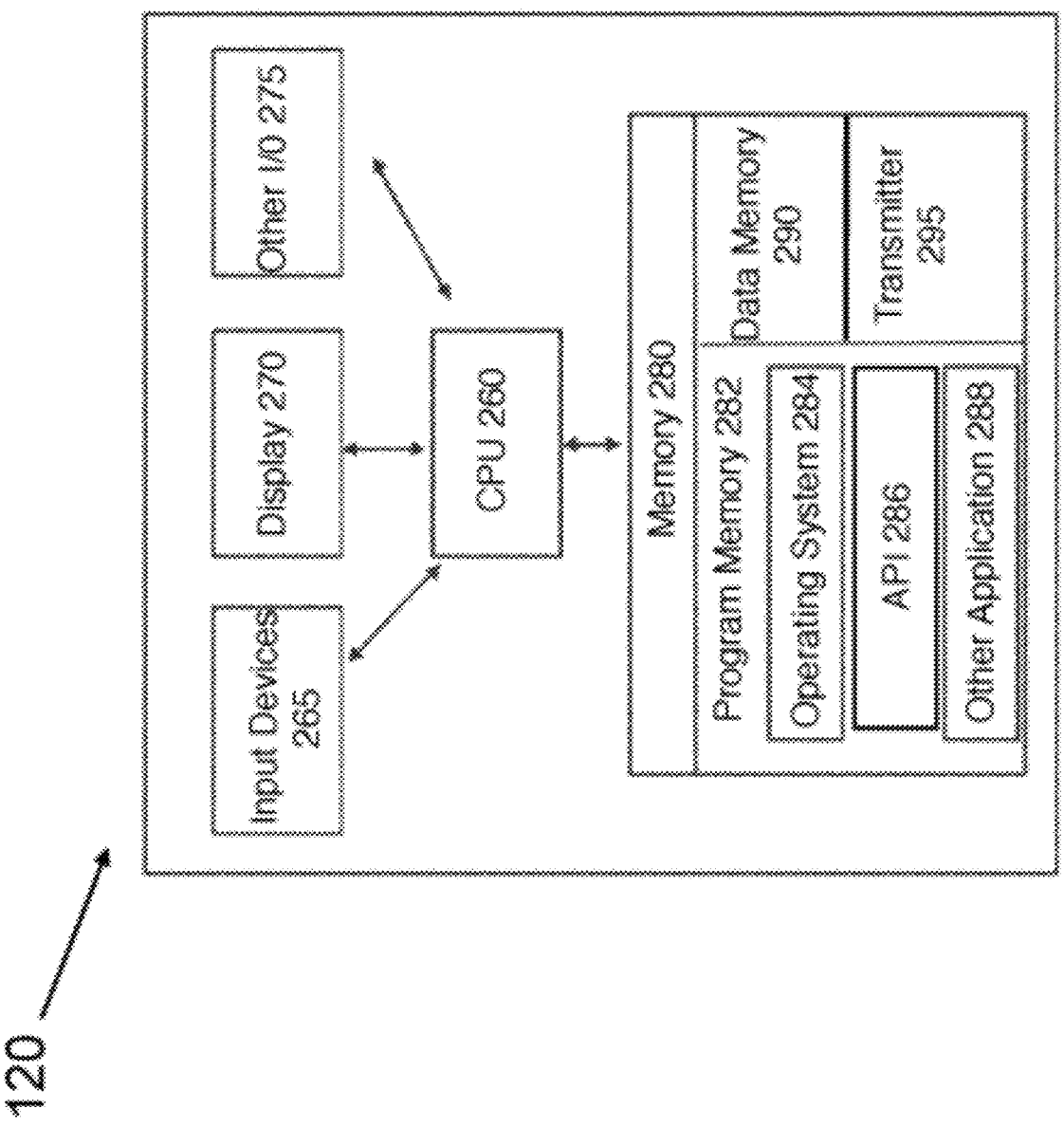
FIG. 2 illustrates the components of the computing device

Turning to FIG. 2, FIG. 2 is a block diagram showing various components of computing devices of control system 120. Computing devices may comprise a housing for con-taining one or more hardware components that allow access to edit and query control system 120. Computing devices may include one or more input devices such as input devices 265 that provide input to a CPU (processor) such as CPU 260 of actions related to the user. Input devices 265 may be implemented as a keyboard, a touchscreen, a mouse, via voice activation, wearable input device, a camera, a track-ball, a microphone, a fingerprint reader, an infrared port, a controller, a remote control, a fax machine, and combina-tions thereof.

The actions may be initiated by a hardware controller that interprets the signals received from input device 265 and communicates the information to CPU 260 using a commu-nication protocol. CPU 260 may be a single processing unit or multiple processing units in a device or distributed across multiple devices. CPU 260 may be coupled to other hard-ware devices, such as one or more memory devices with the use of a bus, such as a PCI bus or SCSI bus. CPU 260 may communicate with a hardware controller for devices, such as for a display 270. Display 270 may be used to display text and graphics. In some examples, display 270 provides graphical and textual visual feedback to a user.

In one or more embodiments, display 270 may include an input device 265 as part of display 270, such as when input device 265 is a touchscreen or is equipped with an eye direction monitoring system. In some implementations, display 270 is separate from input device 265. Examples of display 270 include but are not limited to: an LCD display screen, an LED display screen, a projected, holographic, virtual reality display, or augmented reality display (such as a heads-up display device or a head-mounted device). Display 270 may also comprise a touch screen interface operable to detect and receive touch input such as a tap or a swiping gesture. Other I/O devices such as I/O devices 275 may also be coupled to the processor, such as a network card, video card, audio card, USB, FireWire or other external device, camera, printer, speakers, CD-ROM drive, DVD drive, disk drive, or Blu-Ray device. In further non-limiting embodiments, a display may be used as an output device, such as, but not limited to, a computer monitor, a speaker, a television, a smart phone, a fax machine, a printer, or combinations thereof.

CPU 260 may have access to a memory such as memory 280. Memory 280 may include one or more of various hardware devices for volatile and non-volatile storage and may include both read-only and writable memory. For example, memory 280 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 280 may be a non-transitory memory.

Memory 280 may include program memory such as program memory 282 capable of storing programs and software, including an operating system, such as operating system 284. Memory 280 may further include an application programming interface (API), such as API 286, and other computerized programs or application programs such as application programs 288. Memory 280 may also include data memory such as data memory 290 that may include database query results, configuration data, settings, user options, user preferences, or other types of data, which may be provided to program memory 282 or any element of computing devices.

Computing devices may have a transmitter 295, such as transmitter 295, to transmit the data. Transmitter 295 may have a wired or wireless connection and may comprise a multi-band cellular transmitter to connect to the server over 2G/3G/4G/5G etc. cellular networks. Other embodiments may also utilize Near Field Communication (NFC), Bluetooth, or another method to communicate information.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A transportation system comprising:
two foot spiral devices, each forming a single segment of a three-dimensional log spiral, wherein each spiral device comprises:
component parts with torsion spring functionality;
capability for inversion, clenching and abduction movements;
a tread hub comprising two or more ankle-like joints;
a shaft comprising two lower leg-like devices connecting the tread hub with a wheel hub, wherein the wheel hub comprises two knee-like joints; and
an axle comprising two upper leg-like devices connecting the wheel hub with a pelvis-like device, wherein the pelvis-like device has two hip-like ball-and-socket joints and a swivel seat-like device that rotates back and forth elliptically around an attachment point.

2. The transportation system of claim 1, further comprising a drive mechanism, wherein the drive mechanism comprises a high-torque harmonic drive geared hub motor.

3. The transportation system of claim 2, wherein the two foot spiral devices are configured to: wind by inverting, clenching, and abducting when in a swing phase; unwind by everting, unclenching, and adducting when in a stance phase.

4. The transportation system of claim 2, further comprising a control system, wherein the control system comprises: one or more computing devices; a wireless transmitter and receiver; and circuitry to provide a user interface.

5. The transportation system of claim 4, further comprising one or more sensors to send signals to the control system, wherein the one or more sensors are cliff sensors, impact sensors, or wall sensors.

6. The transportation system of claim 5, further comprising a battery and charging system solar energy collector for collecting and converting solar energy to electrical energy; a controller for distributing the electrical energy; a rechargeable battery for storing the electrical energy.

7. The transportation system of claim 5 wherein the control system is configured to: receive input from the one or more sensors and the drive mechanism; analyze the input; and generate output signals to control the drive mechanism and battery and charging system.

8. A method for a transportation system, the method comprising:
winding a first foot-like spiral device by inverting, clenching, and abducting it during a swing phase;
simultaneously unwinding a second foot-like spiral device by everting, unclenching, and adducting it during a stance phase;
translating torque generated at a tread hub to a pelvis-like device via a virtual shaft, wheel hub, and axle;
rotating a swivel seat-like device back and forth elliptically around an attachment point while maintaining vertical and mediolateral stability; and
repeating the winding and unwinding processes with the first foot-like spiral device and the second foot-like spiral device reversed to complete a full cycle of movement.

* * * * *